US006286032B1

United States Patent
Oberlander et al.

(10) Patent No.: US 6,286,032 B1
(45) Date of Patent: Sep. 4, 2001

(54) METHOD AND APPARATUS IN A COMMUNICATION NETWORK FOR UPDATING AND MAINTAINING RECORD DATA

(75) Inventors: Lewis B. Oberlander, Buffalo Grove; Randall R. Stewart, Crystal Lake; Qiaobing Xie, Palatine, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/412,826

(22) Filed: Oct. 5, 1999

(51) Int. Cl.⁷ ................................... G06F 15/16
(52) U.S. Cl. ..................... 709/203; 707/201; 709/201
(58) Field of Search ................. 707/201, 203; 709/203, 201

(56) References Cited

U.S. PATENT DOCUMENTS

| | | | |
|---|---|---|---|
| 4,558,413 | * 12/1985 | Schmidt et al. | 709/203 |
| 5,765,171 | * 6/1998 | Gehani et al. | 707/203 |
| 5,829,035 | * 10/1998 | James et al. | 711/141 |
| 5,983,241 | * 11/1999 | Hoshino | 707/203 |
| 5,999,947 | * 12/1999 | Zollinger et al. | 707/203 |
| 6,003,042 | * 8/2000 | Melahn | 707/203 |
| 6,098,078 | * 8/2000 | Gehani et al. | 707/203 |
| 6,098,079 | * 8/2000 | Howard | 707/205 |

* cited by examiner

Primary Examiner—Glenton B. Burgess
Assistant Examiner—Bradley Edelman
(74) Attorney, Agent, or Firm—Lalita P. Williams

(57) ABSTRACT

A communication network (100) includes a first server (124) and a second server, such as any of the servers (121–23), connected via a common network (101). First server (124) owns a record data (180) associated with at least one process running for serving a client device (174.) The second server keeps a copy of the record data. First server (124) performs a Hashing function over record data (180) to produce a first Hash value. The second server similarly performs the same or similar Hashing function over the copy of the record data to produce a second Hash value. First server (124) sends the first Hash value to the second server for comparison. If the first Hash value fails to match to the second Hash value, a latest copy of the record data (180) is sent from first server (124) to the second server upon request.

6 Claims, 1 Drawing Sheet

METHOD AND APPARATUS IN A COMMUNICATION NETWORK FOR UPDATING AND MAINTAINING RECORD DATA

RELATED FIELD OF THE INVENTION

The invention generally relates to the field of communications, and more particularly, a communication network.

BACKGROUND OF THE INVENTION

A communication network, such as internet, comprised of a number of servers connected via a common network. Each server serves, i.e. manages, a number of processes that may be initiated by a client device using the network. The operations of such networks are commonly known by one of ordinary skilled in the art.

Referring to FIG. 1, a simplified block diagram of a communication network 100 is shown. Communication network 100 provides a common communication medium 101 for communications between a number of different client devices. Such devices may include computers, wire-line and wireless telephones. To manage the operations between such devices, common communication medium 101 connects servers 121–24. Each device in order to use the network 100 communicates with a server selected from the available servers 121–24. Network 100 may have many servers, however, only four servers are shown for simplicity. Each server may be serving a number of devices. Devices 171–73 and 174 are schematically shown, for example, where respectively each connecting to servers 121 and 124 at what commonly known as internet protocol (IP) addresses 131–34 respectively. Each device in network 100 would have a unique IP address identification.

Other devices may be connected to servers 121–24, which are not shown.

A selected server starts a process on its processor for processing the needs of the client device. The needs may include communicating to another client device served by the same server or another server. A server may run multiple number of processes in order to serve each client device. Such processes at each server are shown by way of processes "1" through "m", and collectively at each server as processes 161–64.

A client device may need more than processes in order to use network 100. Each process independently control a function or a feature of the communication requested by the client device. For example, a communication requested by a client device may include communications of voice, data and video where each requires an independent process. The selected server may also run another process for control and management of the related processes.

Each server requires having a memory device, such as memory devices 151–54 respectively associated with servers 121–24, for storing record data associated with each process. The server that has been selected by the client device creates and maintains such record data, in effect, takes ownership of the record data.

The selected server also sends a copy of the record data associated with each process to other servers. Other servers after receiving the record data store the record data in their associated memory devices. As a result, the memory device of each server contains a copy of the record data that is similar to a copy of the record data at other servers.

The network 100 attempts to maintain consistency between record data stored at the memory device of each server through periodic communications between the server. Such periodic communications update the record data of each process every time the selected server, the record data owner, updates the record data. Updating such record data requires extensive communication traffic in the network 100, which places a heavy burden of data traffic on common communication medium 101.

To effectuate the record data management, each record data is required to have a key identifier in addition to an update sequence number. The update sequence number is incremented each time the data record is updated. The key identifier is shown by way of a set of symbols shown as $S_N^m$. The "N" identifies the server that owns (selected) the record data, and "m" identifies the process within the selected server. For example, record data $S_1^m$ is a record data 180 for process "m" owned by server "1." i.e. server 121. A record data 185 is a record data for process "M" at server 124. All record data are kept in a table format, for example, at memory table 186 at memory device 154.

Each record data may have different parts. For example, record data 180 includes a character field 181 identifying the process, internet protocol (IP) address 182 identifying the client device, "unreliable datagram protocol" (UDP) ports address 183 identifying the logical address of the process at the client device where the process is running, and optional data 184 for different purposes. The record length may vary in different networks. Normally, the UDP address is 16 bits long, and IP address 32 bits. Longer or shorter record length is also possible.

In case a server shuts down or goes out of service for any reason, consistency of each record data stored at each memory device allows continuous and uninterrupted services for the client devices. Data owned by the out-of-service server is systematically adopted by one or more servers to allow continuous and uninterrupted services for the client devices. The network 100 requires a substantial communication bandwidth at common communication medium 101 to manage and accommodate updating such record data.

Therefore, there is a need for a method and apparatus in a communication network for updating and maintaining record data.

SUMMARY OF THE INVENTION

A communication network includes a first server and a second server, connected via a common network. First server owns a record data associated with at least one process running for serving a client device. The second server keeps a copy of the record data. The first server performs a hashing function over the record data to produce a Hash value. The hashing function includes concatenating UDP port information and at least a portion of an IP address to produce a string record A(e). The string record is squared to produce a squared record of A(e), and then the squared record of A(e) is truncated to at least a predetermined record length, such as 32 bits long. The second server similarly performs the same or similar Hashing function over the copy of the record data to produce a second Hash value. The first server sends the first Hash value to the second server for comparison. If the first Hash value fails to match the second Hash value, a latest copy of the record data is sent from the first server to the second server upon request.

DETAILED DESCRIPTION OF THE PREFERRED EMBODIMENTS

Figure 1:
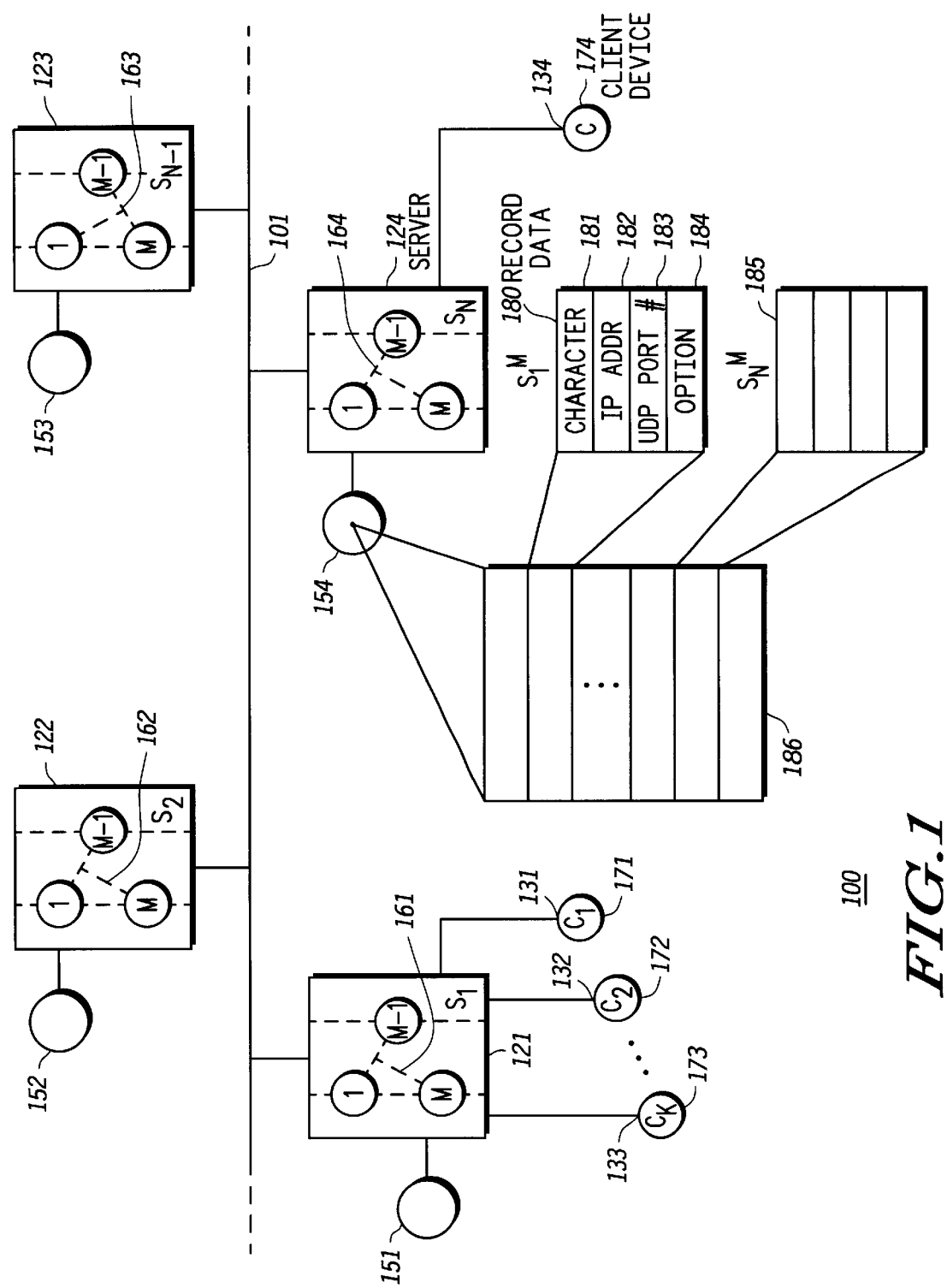
FIG. 1 depicts a communication network 100 where various aspects of the invention are implemented.

According to various aspects of the invention, a communication network includes a first and second servers, such as servers 121–24, connected via a common network 101. The first server, such as server 124 for example, owns a record data, such as record data 180, associated with at least one process running for serving a client device, such as client device 174 for example, using the communication network 100 through the first server. A second server, such as any of the servers 121–23, keeps a copy of the record data. The first server performs a Hashing function over the record data to produce a first Hash value. The second server similarly performs the same or similar Hashing function over the copy of the record data to produce a second Hash value. Hashing function in different forms and method are known by one of ordinary skilled in the art. The first server sends the first Hash value to the second server. The second server compares the first Hash value to the second Hash value. If the first Hash value fails to match to the second Hash value, a latest copy of the record data is sent from the first server to the second server upon request. Accordingly, the amount of data traffic over the common communication network 101 is substantially reduced while the invention maintains consistency of record data kept at different servers.

According to further aspects of the invention, the value of the Hashing functions may be sent over a "heartbeat" check messaging of the network 100. Such "heartbeat" messaging are communicated to maintain integrity of the system by all or most of the servers connected to the network.

The Hashing function may include concatenating UDP port information and at least a portion of IP address to produce a string record of A(e). The string record of A(e) is squared to produce a squared record of A(e). The squared record of A(e) is truncated to at least a predetermined record length, such as 32 bits long.

Furthermore, the first server owns a plurality of record data associated with at least a plurality of processes running for serving the client device using the communication network through the first server, and the second server keeps a copy of the plurality of record data. In such a case, the Hashing function is performed over the plurality of record data to produce said first Hash value. Similarly, the Hashing function is performed over the copy of the plurality of record data to produce the second Hash value. The Hashing function, as such, includes concatenating UDP port information and at least a portion of IP address of each of the plurality of record data to produce a plurality of string records. Each of the plurality of string records is squared to produce a plurality of squared records, followed by summing the plurality of squared records to produce a sum of the plurality of squared records. The sum of the plurality of squared records is truncated to at least a predetermined record length such as 32 bits long.

The plurality of record data may be associated with at least a plurality of processes running for serving a plurality of client devices using the communication network through the first server, according to another aspect of the invention.

A communication network 100 includes a first and second servers, such as servers 121–24, connected via a common network 101. The first server owns a record data, such as record data 180, associated with at least one process running for serving a client device, such as client device 174, using the communication network 100 through the first server. The second server keeps a copy of the record data. The record data have a first update sequence number and the copy of the record data have a second update sequence number. According to an embodiment of the invention, the first update sequence number is sent from the first server to the second server. The first sequence number is compared to the second sequence number. A transmission of the record data from the first server to the second server is requested if sequence of the first sequence number is higher more than two increments than sequence of the second sequence number or if the sequence of the first sequence number is less than or equal the sequence of the second sequence number. Normally, when the updates occur, the data sent does not include every parts of a record data. According to the invention, retransmission of the entire data record takes place only if one of the two conditions specified is satisfied. Accordingly, the invention reduces substantial amount of data communication traffic reduction in the communication network 100.

Implementation of various aspects of the invention in the communication network 100 may be by way of software, hardware or a combination of both. Such implementations, including digital signal processing methods, are well known by one of ordinary skilled in the art.

What is claimed is:

1. A communication network including a first and second servers connected via a common network, wherein said first server owns a record data associated with at least one process running for serving a client device using said communication network through said first server, said second server keeping a copy of said record data, a method in said communication network comprising the steps of:

performing a hashing function over said record data to produce a first hash value, wherein said hashing function comprises concatenating UDP port information and at least a portion of an IP address to produce a string record of A(e), squaring said string record of A(e) to produce a squared record of A(e), and truncating said squared record of A(e) to at least a predetermined record length;

performing said hashing function over said copy of said record data to produce a second hash value; and sending said first hash value from said first server to said second server.

2. The method as recited in claim 1 further comprising the step of:

comparing said first Hash value to said second Hash value;

requesting a latest copy of said record data to be sent from said first server to said second server, when in said comparing said first Hash value fails to match to said second Hash value.

3. The method as recited in claim 1, wherein said first server owns a plurality of record data associated with at least a plurality of processes running for serving said client device using said communication network through said first server, said second server keeping a copy of said plurality of record data, further comprising the steps of:

performing said Hashing function over said plurality of record data to produce said first Hash value;

performing said Hashing function over said copy of said plurality of record data to produce said second Hash value.

4. The method as recited in claim 3 wherein said Hashing function comprising the steps of:

concatenating UDP port information and at least a portion of IP address of each of said plurality of record data to produce a plurality string records;

squaring each of said plurality string records to produce a plurality of squared records;

summing said plurality of squared records to produce a sum of said plurality of squared records;

truncating said sum of said plurality of squared records to at least a predetermined record length.

5. A communication network including a first and second servers connected via a common network, wherein said first server owns a record data associated with at least one process running for serving a client device using said communication network through said first server, said second server keeping a copy of said record data, an apparatus in said communication network comprising:

means for performing a Hashing function over said record data to produce a first Hash value, wherein said hashing function comprises concatenating UDP port information and at least a portion of an IP address to produce a string record of A(e), squaring said string record of A(e) to produce a squared record of A(e), and truncating said squared record of A(e) to at least a predetermined record length;

means for performing said Hashing function over said copy of said record data to produce a second Hash value;

means for sending said first Hash value from said first server to said second server.

6. The apparatus as recited in claim 5 further comprising:

means for comparing said first Hash value to said second Hash value;

means for requesting a latest copy of said record data to be sent from said first server to said second server, when in said comparing said first Hash value fails to match to said second Hash value.

* * * * *